United States Patent [19]

Renaud

[11] Patent Number: 5,488,869
[45] Date of Patent: Feb. 6, 1996

[54] CAPACITIVE ABSOLUTE PRESSURE MEASUREMENT SENSOR AND METHOD OF MANUFACTURING A PLURALITY OF SUCH SENSORS

[75] Inventor: Philippe Renaud, Ochettaz, Switzerland

[73] Assignee: CSEM Centre Suisse d'Electronique et de Microtechnique SA, Neuchatel, Switzerland

[21] Appl. No.: 187,677

[22] Filed: Jan. 28, 1994

[30] Foreign Application Priority Data

Feb. 12, 1993 [FR] France ................... 93 01700

[51] Int. Cl.[6] .................................................. G01L 7/00
[52] U.S. Cl. ...................... 73/724; 73/718; 73/754
[58] Field of Search ........................ 73/715, 718, 724, 73/754

[56] References Cited

U.S. PATENT DOCUMENTS

| | | | |
|---|---|---|---|
| 4,815,472 | 3/1989 | Wise et al. | 73/718 |
| 4,838,088 | 6/1989 | Murakami | 73/724 |
| 5,041,900 | 8/1991 | Chen et al. | 73/724 |
| 5,113,868 | 5/1992 | Wise et al. | 73/718 |
| 5,186,054 | 2/1993 | Sekimura | 73/718 |
| 5,207,103 | 5/1993 | Wise et al. | 73/718 |

FOREIGN PATENT DOCUMENTS 9102748  7/1991  Germany.

OTHER PUBLICATIONS

Elektronik, E. Habokotte et al., Integrierbare Funktionsblocke und Systeme, vol. 39, 5 Jan. 1990, pp. 80–87 XP86381. No translation.

Primary Examiner—Richard Chilcot
Assistant Examiner—Ronald Biegel
Attorney, Agent, or Firm—Pollock, Vande Sande & Priddy

[57] ABSTRACT

The invention relates to a capacitive absolute pressure measurement sensor having a first element (2) in which is arranged a mobile electrode (4), a second element (6) in which is arranged a fixed electrode (8) situated facing and insulated from said mobile electrode (4), a connecting frame (10) interposed between the first element and the second element to define a chamber (12) insulated from the external environment and inside of which there is substantially zero pressure, and a reference volume (14) connected to the chamber. The first element (2) has the configuration of a membrane of substantially constant thickness and the reference volume (14) is arranged at least partially in the second element (6).

2 Claims, 3 Drawing Sheets

CAPACITIVE ABSOLUTE PRESSURE MEASUREMENT SENSOR AND METHOD OF MANUFACTURING A PLURALITY OF SUCH SENSORS

TECHNICAL FIELD

The invention relates to a capacitive absolute pressure measurement sensor and in particular to such a sensor intended to measure absolute pressure and which provides a large reference volume minimizing the residual internal pressure.

BACKGROUND OF THE INVENTION

The invention also relates to a method of manufacturing a plurality of such sensors using semiconductor material micro-machining technologies.

The pressure measurement sensors, made of semiconductor based materials, most commonly used to measure absolute pressure are silicon sensors of the piezo-resistive type.

These piezo-resistive sensors generally comprise a silicon membrane in which are incorporated piezo-resistive elements, that is to say elements whose resistivity varies according to the pressure to which they are subjected.

These sensors, although having a very simple structure and small dimensions, present a number of disadvantages.

Their lack of temperature stability necessitates the use of a temperature compensating circuit in order to obtain an accurate measurement. Added to this are reactions such as interdiffusions between the silicon of the membrane and the piezo-resistive elements, which accelerate the aging process of the sensors.

This is why, when the use of semiconductor sensors requires durability, temperature stability, very high sensitivity and low consumption, capacitive sensors are generally used to measure absolute pressure.

Capacitive sensors generally comprise a first element in which is made a membrane forming a mobile electrode and a second element in which is arranged a zone forming a fixed electrode, known as a counter-electrode. An insulating frame is interposed between the first and the second elements to create a chamber, insulated from the external environment, inside which there is zero pressure. A capacitive absolute pressure sensor is thus produced as the external pressure is measured in relation to the zero pressure, or almost zero pressure, prevailing inside the chamber.

One disadvantage of these sensors arises from the technology for the manufacture of the latter, in this case the semiconductor material micro-machining technology.

In the course of manufacture it is noted that degassing can occur within the structure of the sensor leading to the creation of residual pressure inside the chamber. The sensor does not, thus, under these conditions give an exact reading of the absolute pressure. Furthermore, the volume of gas contained in the chamber varies according to the temperature, so that the stability and/or the reproductibility of the readings are affected.

A known solution to eliminate this problem consists of placing a cavity in the first element in order to create a so-called reference volume. The object of this reference volume in connection with the chamber volume is to reduce the residual pressure caused by the degassing.

However, this solution in itself presents disadvantages.

When the reference volume is located outside the active surface of the membrane, that is to say outside the surface of the sensor which is subjected to pressure, the total surface of the sensor is increased by an amount corresponding to the surface occupied by the reference volume so that, for sensors providing active surface data, the number of realizable sensors on the same wafer of silicon is reduced, which in itself increases the cost of each sensor.

Further, the inclusion of the reference volume in the first element requires machining the latter on two faces which complicates the process considerably.

As these sensors are manufactured in batches from silicon substrate, at the end of the process they must be separated from each other in the course of a cutting operation across the first and second substrates. To this end, it is necessary to provide a supplementary surface at the periphery of the membrane which also reduces the number of sensors which can be produced on the surface of a wafer. Further, this cutting is generally by mechanical sawing, which causes stresses, or even cracks, within the membrane of the sensors, which generally lead to irreparable damage to the sensors.

SUMMARY OF THE INVENTION

It is thus the main object of the invention to overcome the above mentioned disadvantages of the prior art by providing, on the one hand, a capacitive absolute pressure measuring sensor which provides an enlarged reference volume in its active zone and which provides great sensitivity at the same time creating a sensor with a very simple structure, and on the other hand, a simplified and economical method of manufacturing a plurality of these sensors, which eliminates a large number of the risks of damage to the active parts of the sensors, notably at the time of cutting.

It is thus an object of the invention to provide a capacitive absolute pressure measuring sensor comprising a first element in which is arranged a mobile electrode, a second element in which is arranged a fixed electrode situated facing and insulated from said mobile electrode, a connecting frame interposed between the first and the second element to define a chamber, insulated from the external environment and inside which there is substantially zero pressure, and a reference volume connected to said chamber, said sensor being characterised in that the first element has the configuration of a membrane of substantially constant thickness and in that said reference volume is arranged at least partially in the second element.

Thus the ratio of the reference volume to its surface is increased and the sensor presents a temperature stability and a high sensitivity for a total sensor surface substantially equal to that of its active part.

According to a feature of the invention, the reference volume is formed by a groove running around the fixed electrode.

This feature provides the advantage of reducing the size of the active part of the measuring capacitator without reducing the sensitivity of the sensor so that the relative sensitivity of the sensor according to the invention is increased.

The object of the invention is also to provide a method of manufacturing a plurality of integrated capacitive absolute pressure measuring sensors each comprising a mobile electrode formed by a membrane and a fixed electrode, characterised in that it comprises the steps of:

—supplying a first substrate of a semiconductor material,

—supplying a second substrate of a semiconductor material,

—forming a connecting insulating layer on at least one first face of one of said first and second substrates, —structuring the connecting layer to expose a part of said first face to form at least one connecting frame, —structuring the exposed part of said first face to define the fixed electrode and a reference volume, —assembling by soldering under vacuum said first and second substrates using the connecting frame in such a way that that a first face of said second substrate is situated facing said first substrate and so as to define a chamber, insulated from the external environment, inside which the pressure is substantially zero, said chamber being in contact with said reference volume, —thinning the second substrate so as to produce a membrane forming the mobile electrode, —structuring the second substrate to define the outline of said membrane, and for each of the sensors, —forming an electrical contact for each of the fixed electrode and the mobile electrode.

The use of conventional semiconductor material micromachining techniques allows, in addition to maximum miniaturization of the sensors, minimisation of the internal stresses and the drift in temperature of these sensors by the implementation of a series of very simple steps.

BRIEF DESCRIPTION OF THE DRAWINGS

Other features and advantages of the invention will appear more clearly from study of the following description of an embodiment of the invention, given purely by way of illustrative and non-limiting example, this description being made in connection with the drawings in which.

DETAILED DESCRIPTION OF THE INVENTION

Figure 1:
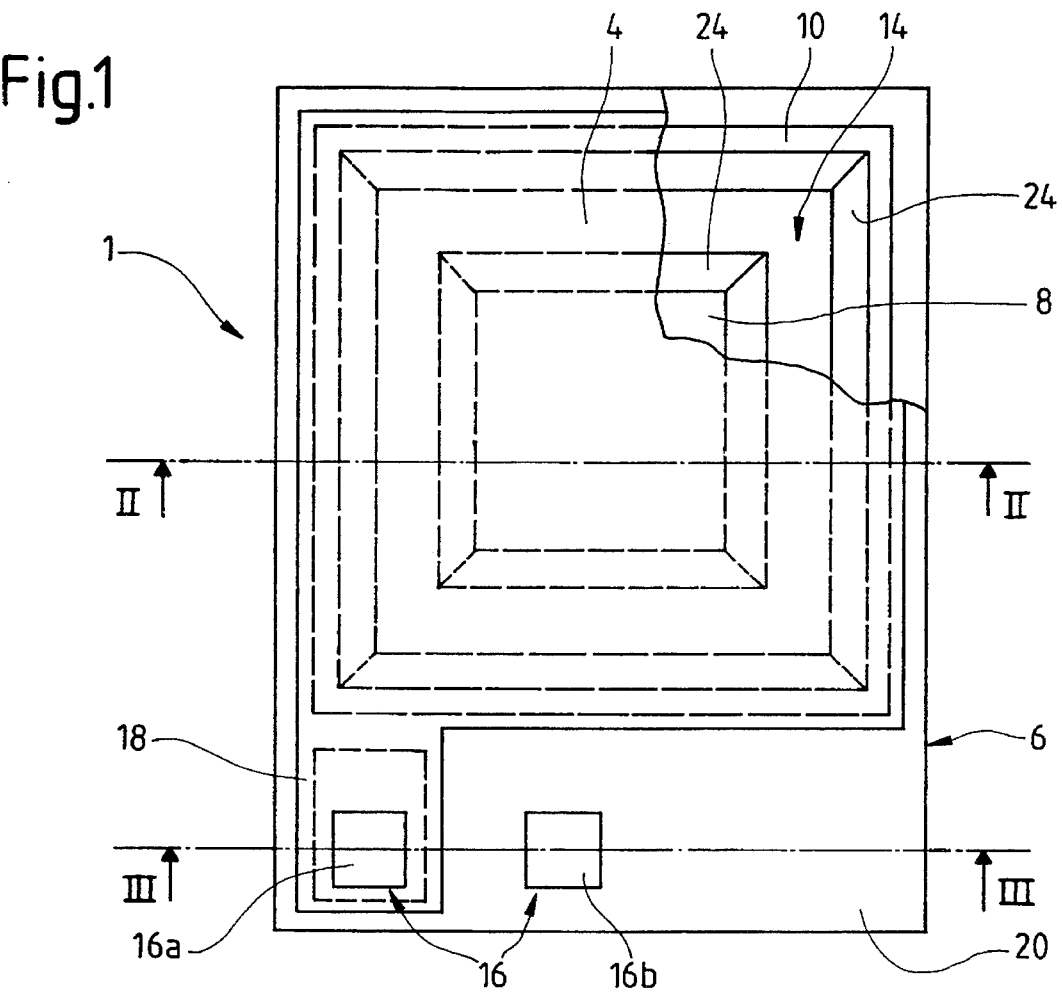
FIG. 1 is a partially broken plan view of an absolute pressure measuring sensor according to the invention.
Figure 2:
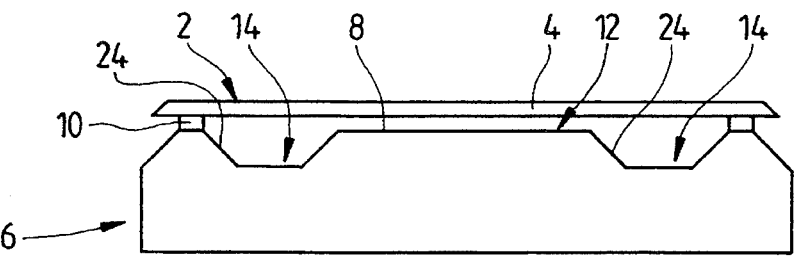
FIGS. 2 and 3 are sectional views taken along line II—II and line III—III respectively of the sensor of FIG. 1.
Figure 3:
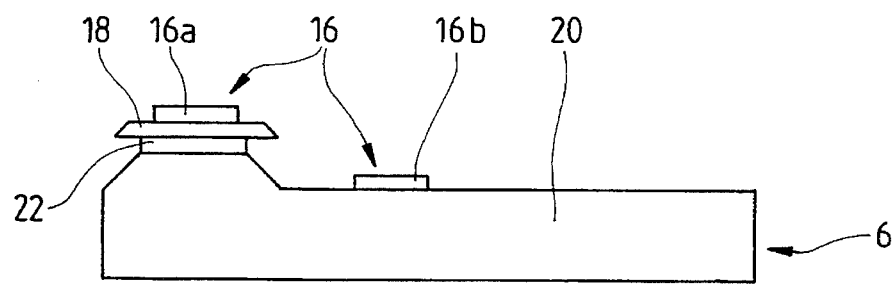

Referring first to FIGS. 1 to 3, a capacitive absolute pressure measuring sensor according to the invention can be seen designed by the general numeral reference 1. In the following description, in the interests of simplification, the sensor defined above will be referred to as a "sensor".

The sensor 1 which is generally of rectangular shape, comprises a first semiconductor element 2 comprising a mobile electrode 4, a second semiconductor element 6 comprising a fixed electrode 8, known as a counter-electrode, which is located more or less facing the mobile electrode 4. The surface of the electrode 4 defines the so-called active surface of the sensor 1, that is to say, the surface sensitive to the pressure which is required to be measured.

The electrode 4 is insulated from the counter-electrode 8 and, to this end, the first element 2 is separated from the second element 6 by an insulating connecting frame 10.

The connecting frame 10 also forms a spacing frame which creates a dielectric space between the mobile electrode 4 and the fixed electrode 8 and thus forms a conventional measuring capacitor. The connecting frame 10 is closed and defines with the membrane 2 and the substrate 6 a chamber 12 which is insulated from the external environment and inside which the pressure is zero or almost zero so that any movement of the mobile electrode 4 is representative of the external pressure, or, in other words, of the pressure to which the active surface of the sensor is subject, and so that the measurement indicated is representative of the absolute pressure.

The sensor also comprises a reference volume 14 in contact with the chamber 12 to reduce the pressure of the gas contained in the chamber 12 which result from the degassing which occurs during the manufacturing of the sensor 1.

Furthermore, the sensor 1 comprises contact means 16 to establish contact with an external measuring circuit (not represented) which, conventionally, interprets the variations in capacity of the capacitor formed by the mobile electrode 4 and the fixed electrode 8 when the external pressure displaces the mobile electrode 4.

The contact means 16 are formed, in the example illustrated, by metallizations 16a, 16b placed respectively on a contact pin 18 linked to the mobile electrode 4 and on a exposed part 20 of the second element 6. In this regard, it will be noted that the pin 18 is supported by a contact stud 22 of identical thickness to the connecting frame 10.

In the example illustrated, the first and second elements are made of monocrystalline silicon and the connecting frame is made of silicon oxide.

Moreover, the first element 2 comprising the mobile electrode 4 has the configuration of a membrane which presenting substantially constant thickness over its entire surface.

This membrane has a general square shape and remains linked in one of its corners to the contact pin 18. Furthermore, the membrane extends substantially within the edge of the second element 6 for reasons which will become clear in the course of this description.

It is thus easily understood that, for an identical total surface of the sensor, the active surface of the sensor is increased in relation to that of the sensors of the prior art in which the membrane is produced by a chemical etching of a part of the surface of the first silicon element 2 which is achieved according to the crystallographic planes inclined approximately 57% in relation to this surface and which consequently leads to a reduction in the active surface vis-à-vis the total surface of the sensor.

The thickness of this membrane may vary and can be adjusted according to the sensitivity and/or the range of pressures that is to be measured.

Furthermore, the sensor according to the invention has a cavity forming the reference volume 14 which is placed in the second element 6. More particularly, the volume 14 is composed of a groove which extends around the fixed electrode 8 and whose walls 24 are bell-mouthed.

The method of manufacturing of a plurality of sensors 1 according to the invention will now be described in connection with FIGS. 4 to 10.

Figure 4:
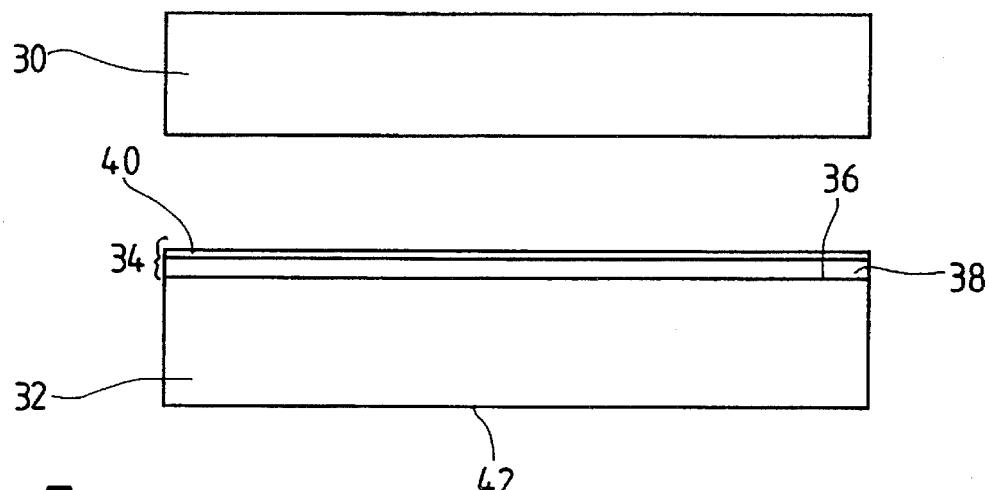
FIGS. 4 to 10 are sectional views taken along line II—II of FIG. 1 of a capacitive absolute pressure measuring sensor according to the invention represented at different stages of the method of manufacturing according to the invention.

It will be noted that, taking account of the small dimensions of the sensors and for practical reasons which will be easily understood, the method of manufacturing according to the invention applies to the simultaneous manufacture of a large number of sensors each comprising a fixed electrode 8 and a mobile electrode 4 separated by an open space 12 of slight thickness, from two complementary wafers defining a first substrate 30 and a second substrate 32 as shown in FIG. 4. However, the description and the drawing will, for simplification, refer only to the manufacture of a single sensor 1.

It is, moreover, important to note that the values of the various parameters, such as the temperatures, the times, the etchant used, etc., which will be mentioned below, are in no way limiting and mainly depend on the materials and apparatus used. These values can easily be determined by a person skilled in the art.

The wafers (not shown) defining the first and second substrates 30, 32 from which the sensor 1 is manufactured are made of a semiconductor material such as monocrystalline silicon and, preferably, having the orientation <100>.

FIG. 4 shows the first substrate 30 and the second substrate 32 after their preparation and the forming of a connecting layer 34 in an insulating material on a first face 36 of the second substrate 32.

The preparation of the substrates consists for example of cleaning their surfaces such as in the way described in the publication entitled "RCA Review" No 31 page 187, 1970.

The connecting layer 34 comprises a lower layer 38 in a material which reacts to a first etchant and an upper layer 40 in a material which reacts to a second etchant but which hardly reacts to the first.

In this case, the lower layer 38 is made of silicon oxide ($SiO_2$) and the upper layer 40 is made of silicon nitride ($SiN_x$).

In the example disclosed, the lower layer 38 has been formed by thermal oxidation of the second substrate 32 in an oven at around 1100° C. and under an oxidising atmosphere for several hours. By way of example, to obtain a layer 38 having a thickness of approximately 2000 Å, this second substrate 32 needs to be left in an oven for about 10 hours.

It will be noted that the second face 42 of the second substrate 32 was protected during this step of formation of the layer 38. The presence or absence of this protection has no effect, however, on the development of the process of the invention.

It goes without saying that, in one embodiment, the formation of the layer 38 can be achieved by chemical or physical vapour phase deposition (CVD or PVD).

The upper layer 40 is then deposited on the surface of the lower layer 38, for example by low pressure chemical vapour phase deposition, to a thickness of approximately 0.15 μm.

Figure 5:
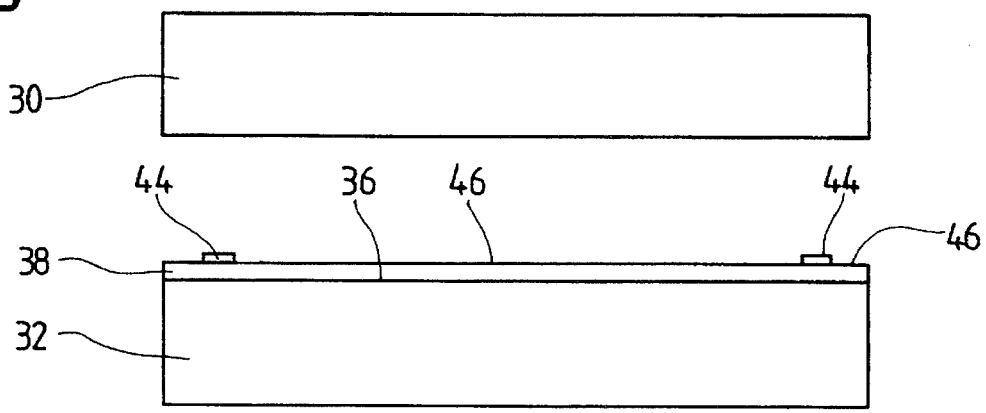
Figure 6:
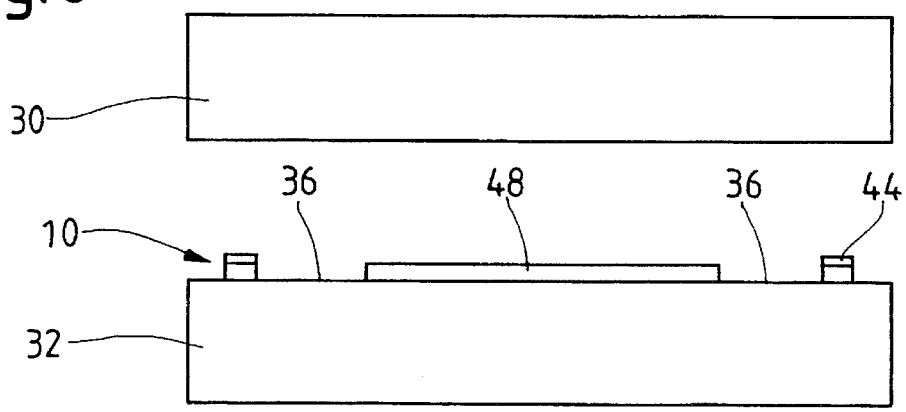
Figure 7:
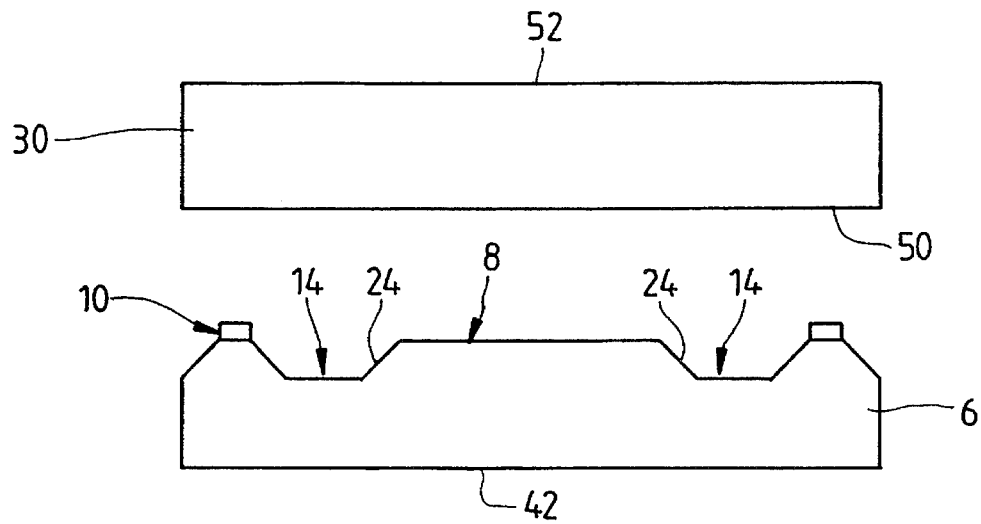

FIGS. 5 to 7 show the structuring step of the connecting layer 34 and of a part of the surface 36 of the second substrate 32 to define respectively the connecting frame 10 and the groove 14 which forms the reference volume and which delimits the outline of the fixed electrode 8 of the sensor 1. As is shown in FIG. 1, the connecting frame is of a general square shape and the fixed electrode 8 has the shape of a square surface which extends concentrically to the connecting frame 10.

To do this, a first layer of photoresist (not shown) is deposited on the entire surface of the upper layer 40, this first layer of photoresist is insolated through a mask (also not shown), the insolated parts of the first photosensitive layer are conventionally eliminated, for example by using a humid etchant, and the exposed parts of the upper layer 40 are etched using the first etchant to the surface of the lower layer 38, so that the remaining parts 44 of the upper layer 40 in the form of a frame make up a mask for the formation of the connecting frame 10 at the next step as is shown in FIG. 5.

A second layer of photoresist (not shown) is then deposited on the remaining parts 4 and on the parts 46 of the lower layer 38 exposed at the preceding step. This second layer of photoresist is insolated through a second mask (also not shown), the insolated parts of the second layer of photoresist are eliminated by conventional means, for example by using a humid etchant, so that the only photoresist left is disposed more or less concentrically to the frame 10 and covers a square 48 of the lower layer 38 whose surface corresponds to Chat of the fixed electrode 8. Using the second etchant the exposed parts of the lower layer 38 are etched until the face 36 of the second substrate is exposed. The remaining parts of the photosensitive layer are then eliminated.

The upper layer 40 is etched, for example, by means of a chlorine plasma, whilst the etching operation of the lower layer 38 is achieved, for example, by using a solution of hydrofluoric acid (HF). The elimination of the remaining parts of the first and second layers of photoresist is achieved by conventional means, for example using a humid etchant in a suitable solvent or by means of a plasma under oxygen atmosphere.

This leads to the structure illustrated in FIG. 6 in which the surface 36 of the second substrate comprises the connecting frame 10 and the square 48 of the lower layer protected by the photoresist in the preceding step.

The parts of the face 36 not protected by the connecting frame and the square 48 will be etched in a later step to define the groove 14 constituting the reference volume of the sensor according to the invention.

By using the connecting frame 10 and the square 48 formed by the lower layer as etching masks, the step illustrated in FIG. 7 consists of an anisotropic etch of the exposed parts of the face 36 using a third etchant which reacts mainly with the material of the second substrate but does not react with the materials of the lower and upper layers. The square 48 is then eliminated by etching using the second etchant.

By way of example, the etching of the groove 14 is achieved using a humid etchant in a solution of KOH to a depth of the order of 100 μm and the elimination of the square 48 is achieved by an etch using a humid etchant in a solution of HF.

As shown in FIG. 7, the lateral walls 24 of the groove 14 are bell-mouthed outwards because of the difference in speed of etching of the different crystalline planes of the substrate by the etchant, The second substrate 32 being structured, the next step consists of eliminating the remaining parts 44 of the upper layer 40 ($SiN_x$) with a view to the last step of assembly with the first substrate 30 and to form the second element 6.

In this case, the elimination of the parts 44 of the upper layer 40 is achieved, for example, by means of a plasma etch.

The next step consists of putting in place the first substrate 30 so that a first 50 of its faces is situated facing the structured face 36 of the second substrate 32 or second element 6.

The two substrates 30, 32 being prepared, the latter is then assembled by autogeneous soldering under a vacuum. To do this, the two substrates 30, 32 are placed in an oven preheated to a temperature of about 1100° C. in which there is substantially zero pressure.

Figure 8:
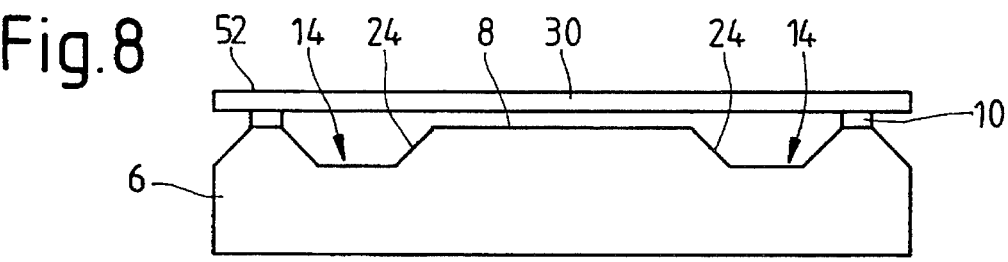

At the following step illustrated in FIG. 8, the first substrate 30 is thinned, that is to say that the second face 52 of this second substrate 32 which is exposed, is etched until the first substrate 30 reaches a predetermined thickness.

To do this, the two substrates 30 and 32, assembled by the connecting frame 10 are dipped in a solution of etchant at a specific concentration, at a specific temperature and for a specific period of time to obtain the desired thickness, approximately 80 μm in the example described.

In order to avoid etching the face 42 of the second substrate 32 during this thinning step of the first substrate 30, the face 42 is mechanically protected from any contact with the etchant. According to another embodiment, a protective layer of a material which does not react to an etch by the third etchant can also be deposited.

Figure 9:
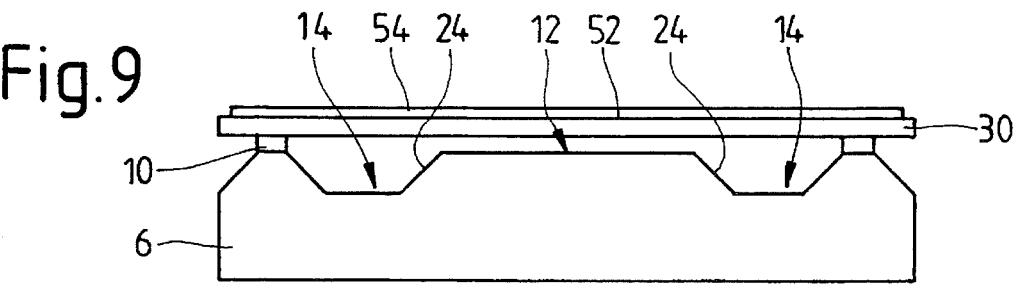

FIG. 9 illustrates the etching step of the first substrate 30 with a view to defining the outline of the membrane constituting the electrode 4. This stage consists of depositing a protective layer 54 which will be configured by conventional photolithographic techniques to etch the exposed parts of the first substrate and to eliminate the protective layer 54.

In the example disclosed, silicon nitride (SiNx) is deposited on the entire surface of the face 52, for example by low pressure chemical vapor deposition.

Next, a third layer of photoresist (not shown) is deposited on the protective layer 54. This third layer of photoresist is insolated through a third mask (also not shown), the insolated parts of the third layer are eliminated conventionally, for example using a humid etchant, in this case one part of a strip extending along one side of the face 52 as well as a narrow border of said face 52 to configure the electrode as it is shown in outline on FIG. 1.

Using an etchant, the exposed parts of the protective layer are then etched, then the remaining parts of the photoresist are eliminated. This leads to the structure illustrated at FIG. 9 in which the face 52 is completely covered by the protective layer 54 with the exception of one strip extending along the edge of the face 52 of the first substrate and the narrow border of the face 52 which were covered by the photoresist.

The unprotected parts by the silicon nitride, of the face 52 of the first substrate 30 are then etched on their entire thickness, for example, using the same etchant used during the thinning step of the first substrate 30.

Figure 10:
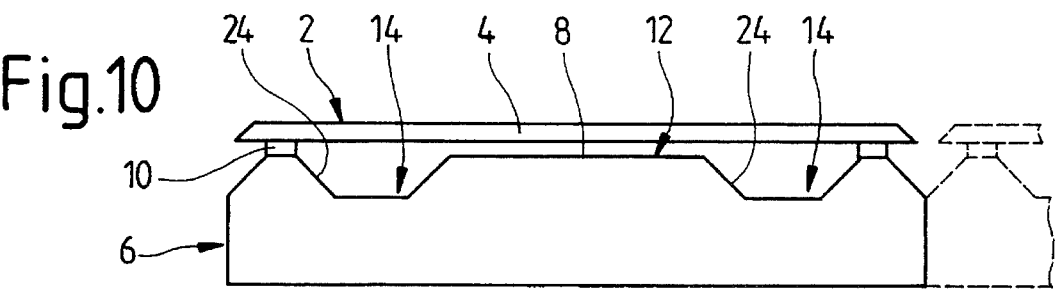

According to one feature of the manufacturing process of the invention, and as emerges from FIG. 10 in which an adjacent sensor is shown in dotted line, it will be noted that during the etching which has just been effected, the peripheral parts of the first substrate 30 formed by the first element 2 and which itself forms the mobile electrode 4 of each of the sensors 1, separate from each other, in such a way that the individual sensors can be separated from each other by a simple sawing step of the sole second substrate 32 or element 6.

The next step consists of forming the contact means respectively for the first 2 and the second 6 elements.

As emerges from FIG. 1, the contact 16a is formed on the lug 18 linked to the mobile electrode 4 and placed along the edge of the latter and the contact 16b is formed on the exposed edge 20 of the second element 6. The contact pads 16a, 16b are achieved by vacuum evaporation of a metal, for example aluminium, through a mask (not shown). Of course, these contact pads 16a, 16b can also be produced by cathode sputtering.

The sensors thus formed, each having a mobile electrode 4 and a fixed electrode 6 composed respectively of the parts 2 and 6 of the first substrate 30 and of the second substrate 32, are then separated from each other at the time of the conventional sawing step and are each encapsulated in a housing or package, not shown, provided for this purpose. It should be noted that the figures do not represent the exact relative dimensions of the various elements in proportion to one another, these dimensions being sometimes highly exaggerated for greater clarity. To give an idea of the dimensions, a sensor produced according to the process of the invention has the general dimensions $1.9 \times 2.2 \times 0.5$ mm$^3$, the surface of the membrane is approximately $1.7 \times 1.7$ mm$^2$, the thickness of the membrane is approximately $60 \times 10^{-6}$ m and the thickness of the connecting frame is approximately $2 \times 10^{-6}$ m. With such dimensions, the measuring capacity and the parasitic capacity are respectively in the order of 6pF and 5pF.

What is claimed is:

1. A capacitive absolute pressure measuring sensor comprising a first element forming a mobile electrode, a second element forming a fixed electrode positioned facing and separated from said mobile electrode, and a connecting frame interposed between said first and second elements, said first and second elements being electrically conductive, said connecting frame constituting a part distinct from said first and second elements and being made of an insulating material such that said first and second elements are electrically insulated from each other, said connecting frame together with said first and second elements defining a chamber isolated from the external environment and inside of which there is substantially zero pressure, said second element having a surface facing said first element, said surface comprising an active part and a cavity disposed outside of said active part, and said cavity being formed by a groove extending around said active part.

2. A measuring sensor according to claim 1, wherein the first and second elements are made of at least one semiconductor material and said connecting frame is made of an oxide of said material.

\* \* \* \* \*